(12) United States Patent
Basso et al.

(10) Patent No.: US 6,292,805 B1
(45) Date of Patent: Sep. 18, 2001

(54) SYSTEM AND METHOD FOR PROCESSING OBJECT-BASED AUDIOVISUAL INFORMATION

(75) Inventors: Andrea Basso, N. Long Branch, NJ (US); Alexandros Eleftheriadis; Hari Kalva, both of New York, NY (US); Atul Puri, Riverdale, NY (US); Robert Lewis Schmidt, Howell, NJ (US)

(73) Assignees: AT&T Corp.; Columbia University, both of New York, NY (US)

( * ) Notice: Subject to any disclaimer, the term of this patent is extended or adjusted under 35 U.S.C. 154(b) by 0 days.

(21) Appl. No.: 09/067,015

(22) Filed: Apr. 28, 1998

Related U.S. Application Data

(60) Provisional application No. 60/062,120, filed on Oct. 15, 1997.

(51) Int. Cl.[7] .................................................. G06F 17/30
(52) U.S. Cl. ........................... 707/104; 707/103; 707/205
(58) Field of Search ........................... 707/100, 102–104, 707/200, 205

(56) References Cited

U.S. PATENT DOCUMENTS

| | | | |
|---|---|---|---|
| 5,563,648 | 10/1996 | Menand et al. | 725/142 |
| 5,574,905 | * 11/1996 | de Carmo | 707/1 |

(List continued on next page.)

FOREIGN PATENT DOCUMENTS 0 684 570 A1   11/1995   (EP).

OTHER PUBLICATIONS

J. Laier et al., "Content–Based Multimedia Data Access in Internet Video Communication", *First International Workshop on Wireless Image/Video Communications*, Sep. 1996, pp. 126–133.

A. Eleftheriadis et al., "Stored File Format for Object–based Audio Visual Representation", pp. 1–8, No Date.

(List continued on next page.)

*Primary Examiner*—Maria N. Von Buhr

(57) ABSTRACT

Audiovisual data storage is enhanced using an expanded physical object table utilizing an ordered list of unique identifiers for a particular object for every object instance of an object contained in segments of a data file. Two object instances of the same object in the same segment have different object identifiers. Therefore, different instances of the same object use different identification and the different object instances may be differentiated from one another for access, editing and transmission. The necessary memory required for randomly accessing data contained in files using the expanded physical object table may be reduced by distributing necessary information within a header of a file to simplify the structure of the physical object table. In this way, a given object may be randomly accessed by means of an improved physical object table/segment object table mechanism.

63 Claims, 7 Drawing Sheets

U.S. PATENT DOCUMENTS

| | | | |
|---|---|---|---|
| 5,596,565 | | 1/1997 | Yonemitsu et al. ............... 369/275.3 |
| 5,694,334 | * | 12/1997 | Donahue et al. ............... 395/200.77 |
| 5,696,500 | * | 12/1997 | Diem ............................... 340/825.44 |
| 5,732,256 | * | 3/1998 | Smith ....................................... 707/1 |
| 5,737,595 | * | 4/1998 | Cohen et al. ......................... 707/100 |
| 5,737,599 | * | 4/1998 | Rowe et al. .......................... 707/104 |
| 5,754,242 | | 5/1998 | Ohkami ................................. 348/441 |
| 5,794,250 | | 8/1998 | Cariño, Jr. et al. .................. 707/104 |
| 5,848,410 | * | 12/1998 | Walls et al. ............................... 707/4 |
| 5,894,310 | * | 4/1999 | Arsenault et al. ................... 345/433 |
| 5,928,330 | * | 7/1999 | Goetz et al. ......................... 709/231 |
| 5,940,840 | * | 8/1999 | Eshel et al. .......................... 707/205 |
| 5,956,729 | * | 9/1999 | Goetz et al. ......................... 707/104 |

OTHER PUBLICATIONS

J. Heid, "Watch This: Streaming Video on Your Web Site", *create WEB,* Apr. 1998, pp. 109–112.

A. Griffin, "Video on the Net", *Popular Mechanics,* Mar. 1998, pp. 51–53.

L. Chiariglione, "MPEG and Multimedia Communications", *IEEE Transactions on Circuits and Systems for Video Technology,* vol. 7, No. 1, Feb. 1997, pp. 5–18.

A. Eleftheriadis et al., "Stored File Format for MPEG–4", *International Organization for Standardization,* ISO/IEC JTC1/SC29/WG11 MPEG97/M2062, Apr. 1, 1997, pp. 1–4.

Y. Fang et al., "Adding Bitstream Input/Output Library in Java", *International Organization for Standardization,* ISO/IEC JTC1/SC29/WG11 MPEG97/M2063, Apr. 1, 1997, pp. 1–6.

A. Puri et al., "APIs for MPEG–4 Systems", *International Organization for Standardization,* ISO/IEC JTC1/SC29/WG11 MPEG97/2133, Apr. 1997.

A. Basso et al., "MPEG–4 Integrated Intermedia Format (IIF): Basic Specification", *International Organization for Standardization,* ISO/IEC JTC1/SC29/WG11 MPEG98/M2978, Jan. 16, 1998, pp. 1–22.

* cited by examiner

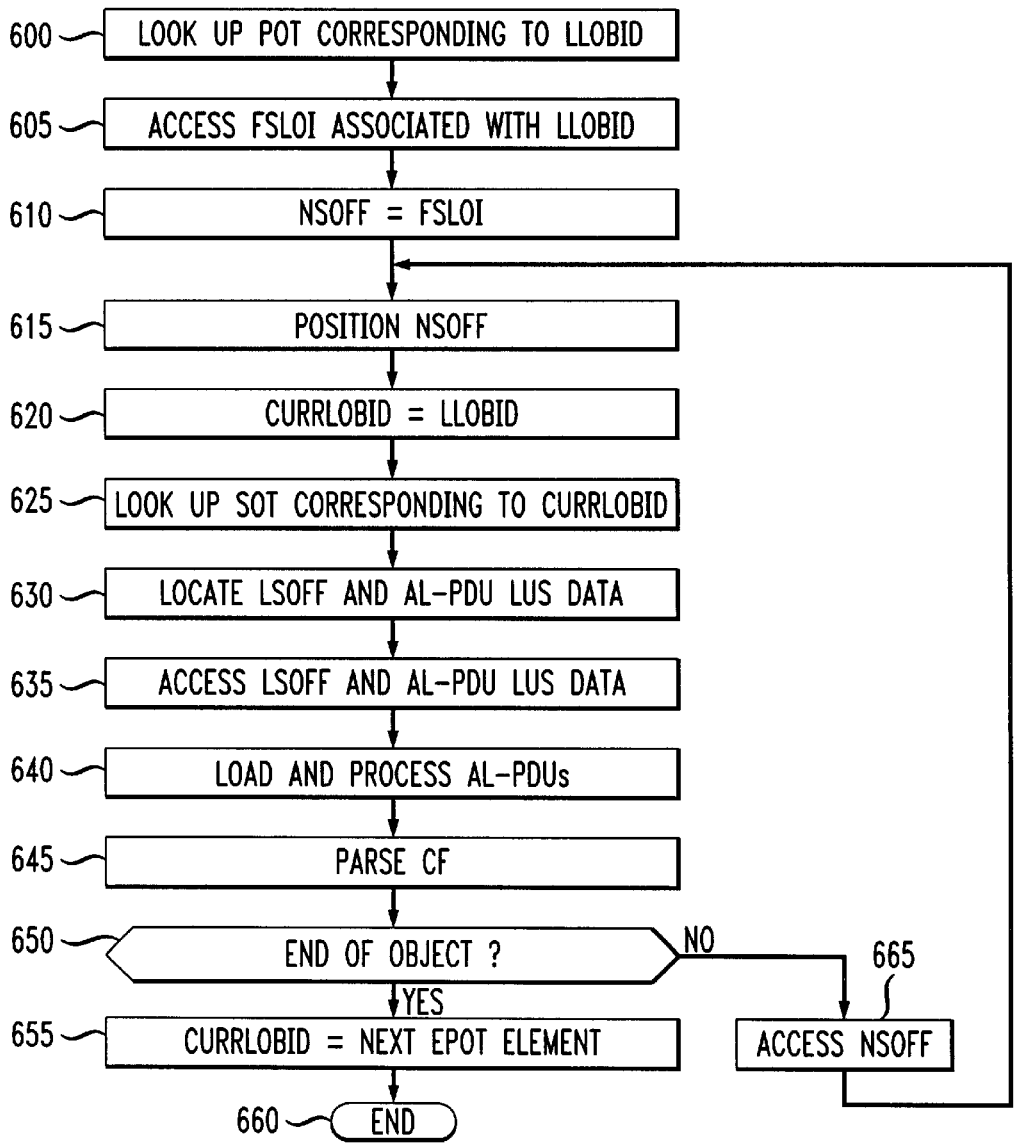

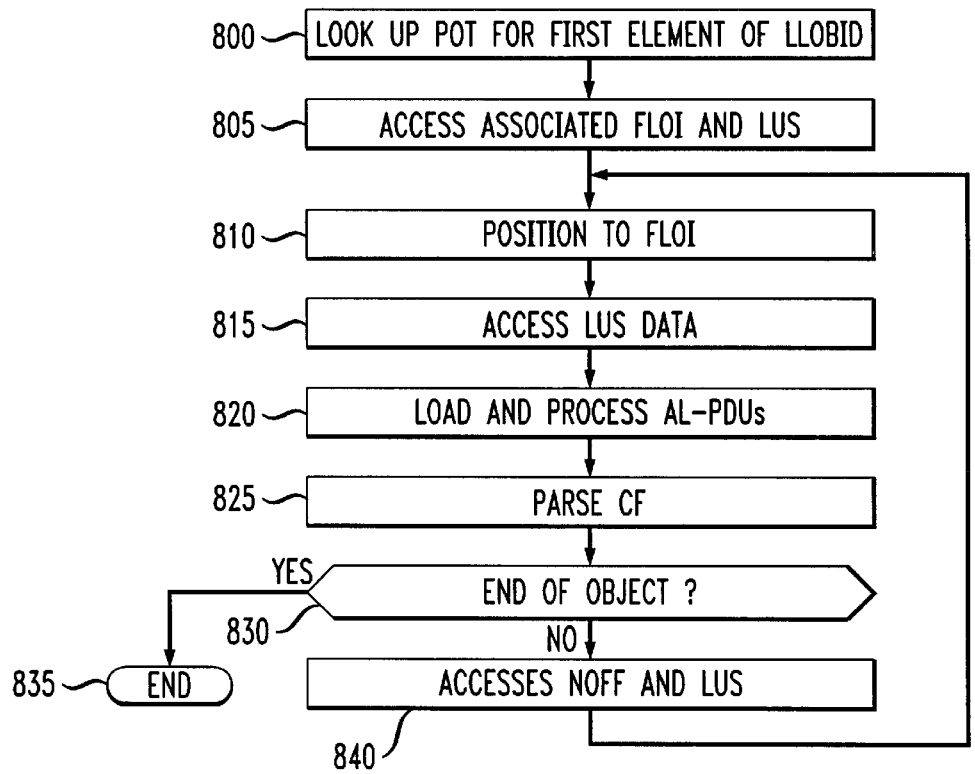

FIG. 9
FIG. 10
| | | 1000 | 1050 |
|---|---|---|---|
| COUNT | ICOUNT | LOBID1 | FLOI1 |
| | | LOBID2 | FLOI2 |
| | | LOBID3 | FLOI3 |
| | | LOBID4 | FLOI4 |
| ICOUNT | LOBID1 | FLOI1 |
|---|---|---|
| | LOBID2 | FLOI2 |
| | LOBID3 | FLOI3 |
| | LOBID4 | FLOI4 |
FIG. 11
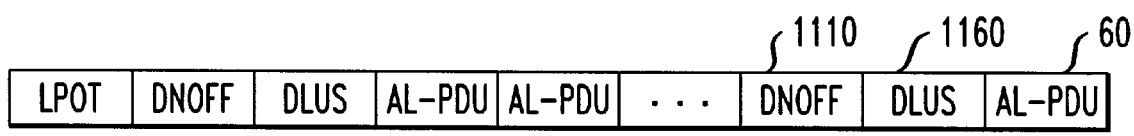

SYSTEM AND METHOD FOR PROCESSING OBJECT-BASED AUDIOVISUAL INFORMATION

CROSS-REFERENCE TO RELATED APPLICATIONS

This nonprovisional application claims the benefit of U.S. Provisional Application(s) No. 60/062,120 filed Oct. 15, 1997.

This application is related to U.S. Provisional Application Ser. No. 60/062,120 filed Oct. 15, 1997, from which priority is claimed, and is also related to, a continuation-in-part of, and commonly assigned with U.S. application Ser. No. 09/055,933 entitled "System and Method for Processing Object-Based Audiovisual Information" filed Apr. 7, 1998 now U.S. Pat. No. 6,079,566.

BACKGROUND OF THE INVENTION

1. Field of Invention

The invention relates to information processing, and more particularly to advanced storage and retrieval of audiovisual data objects according to the MPEG-4 standard, including utilization of an expanded physical object table including a list of local object identifiers.

2. Description of Related Art

In the wake of rapidly increasing demand for network, multimedia, database and other digital capacity, many multimedia coding and storage schemes have evolved. Graphics files have long been encoded and stored in commonly available file formats such as TIF, GIF, JPG and others, as has motion video in Cinepak, Indeo, MPEG-1 and MPEG-2, and other file formats. Audio files have been encoded and stored in RealAudio, WAV, MIDI and other file formats. These standard technologies have advantages for certain applications, but with the advent of large networks including the Internet the requirements for efficient coding, storage and transmission of audiovisual (AV) information have only increased.

Motion video in particular often taxes available Internet and other system bandwidth when running under conventional coding techniques, yielding choppy video output having frame drops and other artifacts. This is in part because those techniques rely upon the frame-by-frame encoding of entire monolithic scenes, which results in many megabits-per-second data streams representing those frames. This makes it harder to reach the goal of delivering video or audio content in real-time or streaming form, and to allow editing of the resulting audiovisual scenes.

In contrast with data streams communicated across a network, content made available in random access mass storage facilities (such as AV files stored on local hard drives) provide additional functionality and sometimes increased speed, but still face increasing needs for capacity. In particular, taking advantage of the random access characteristics of the physical storage medium, it is possible to allow direct access to, and editing of, arbitrary points within a graphical scene description or other audiovisual object information. Besides random access for direct playback purposes, such functionality is useful in editing operations in which one wishes to extract, modify, reinsert or otherwise process a particular elementary stream from a file.

In conjunction with the development of MPEG-4 coding and storage techniques, it is desirable to provide an improved ability to perform random access of audiovisual objects within video sequences. The opportunity to streamline random access would highlight and strengthen the potential of advanced capabilities provided by MPEG-4, and relieve the demands that those capabilities may impose on resources.

Part of the approach underlying MPEG-4 formatting is that a video sequence consists of a sequence of related scenes separated in time. Each picture is comprised of a set of audiovisual objects that may undergo a series of changes such as translations, rotations, scaling, brightness in color variations, etc., from one scene to the next. New objects can enter a scene and existing objects can depart, leaving certain objects present only in certain pictures. When scene changes occur, the entire scene and all the objects comprising the picture may be reorganized or initialized.

One of the identified functionalities of MPEG-4 is improved temporal random access, with the ability to efficiently perform random access of data within an audiovisual sequence in a limited time, and with fine resolution parts (e.g., frames or objects). Improved temporal random access techniques compatible with MPEG-4 involve content based interactivity requiring not only the ability to perform conventional random access, accessing individual pictures, but also the ability to access regions or objects within a scene.

While the MPEG-4 file format described in U.S. application Ser. No. 09/055,933 now U.S. Pat. No. 6,079,566, entitled "System and Method for Processing Object-Based Audiovisual Information" realizes such advantages, that approach includes at least two disadvantages prompted in part on that file format's reliance on a standard physical object table (POT) and segment object table (SOT) structure.

The first problem occurs when multiple instances of the same object exist in the same data segment. In the SOT, different instances of the same object use the same object identification (OBID). Therefore, there is no way using mainstream MPEG-4 to access the different object instances from the POT because the data field used as an access key, i.e., the OBID, is identical.

A second problem is that the POT/SOT structure does not recognize the possibility that object identifiers, OBIDs, can be reused. The POT does not include a list of temporal changes that the OBID assumes. Therefore, while MPEG-4 represents a powerful and flexible object-based standard for audiovisual processing, enhancements are desirable.

SUMMARY OF THE INVENTION

The invention overcomes these and other problems in the art and relates to an enhanced audiovisual coding and storage technique, related to MPEG-4, by introducing enhanced formatting including an expanded physical object table which utilizes an "ordered" list of unique identifiers for a particular object for every object instance. Therefore, using the invention, two object instances of the same object in the same segment can be separately identified. Thus, among other advantages, different instances of the identical object may be differentiated from one another.

The term "ordered" herein denotes that all adaptation layer protocol data (AL PDUs) of the same object instance are placed in the file in their natural order of occurrence, or coding order.

An additional benefit of the invention is that a given object instance can change its local identifier in time and still be randomly accessed by means of an improved POT/SOT mechanism.

The invention in one aspect relates to a method of composing data in a file, and a medium for storing that file, the file including a file header containing physical object information and logical object information, and generating a sequence of audiovisual segments, each including a plurality of audiovisual objects. The physical object information and the physical object information contains pointers to access the audiovisual segments.

In another aspect the invention provides a corresponding method of extracting data from a file, including by accessing a file having a header which contains physical object information and logical object information, and accessing audiovisual segments contained therein.

In another aspect the invention provides a system for processing a data file including a processor unit and a storage unit connected to the processor unit, the storage unit storing a file including a file header and a sequence of audiovisual segments. The file header contains physical object information and logical object information, and the physical object information contains pointers to access the audiovisual segments.

BRIEF DESCRIPTION OF THE DRAWINGS

The invention will be described with reference to the accompanying drawings, in which like elements are designated by like numbers and in which:

FIG. 5 illustrates the format of the EPOT utilized in the first illustrative embodiment of the invention;

FIG. 6 illustrates a data access algorithm performed in connection with the first illustrative embodiment of the invention;

FIG. 7 illustrates the format of the FPOT utilized in the second illustrative embodiment of the invention;

FIG. 8 illustrates a data access algorithm performed in connection with the second illustrative embodiment of the invention;

FIG. 9 illustrates the memory format utilized in conjunction with the FPOT according to the second illustrative embodiment of the invention;

FIG. 10 illustrates the file format of a local POT (LPOT) utilized in the third illustrative embodiment of the invention;

FIG. 11 illustrates the file structure based on the LPOT illustrated in FIG. 10 according to the third illustrative embodiment of the invention.

DETAILED DESCRIPTION OF PREFERRED EMBODIMENTS

The invention will be described in terms of illustrative embodiments in which audiovisual data is accessed from, and output to, file structures for use in data streams configured according to the MPEG-4 format. Further description of that format is made in the aforementioned copending U.S. application Ser. No. 09/055,933, now U.S. Pat. No. 6,079,566, the disclosure of which is incorporated by reference.

Figure 1:
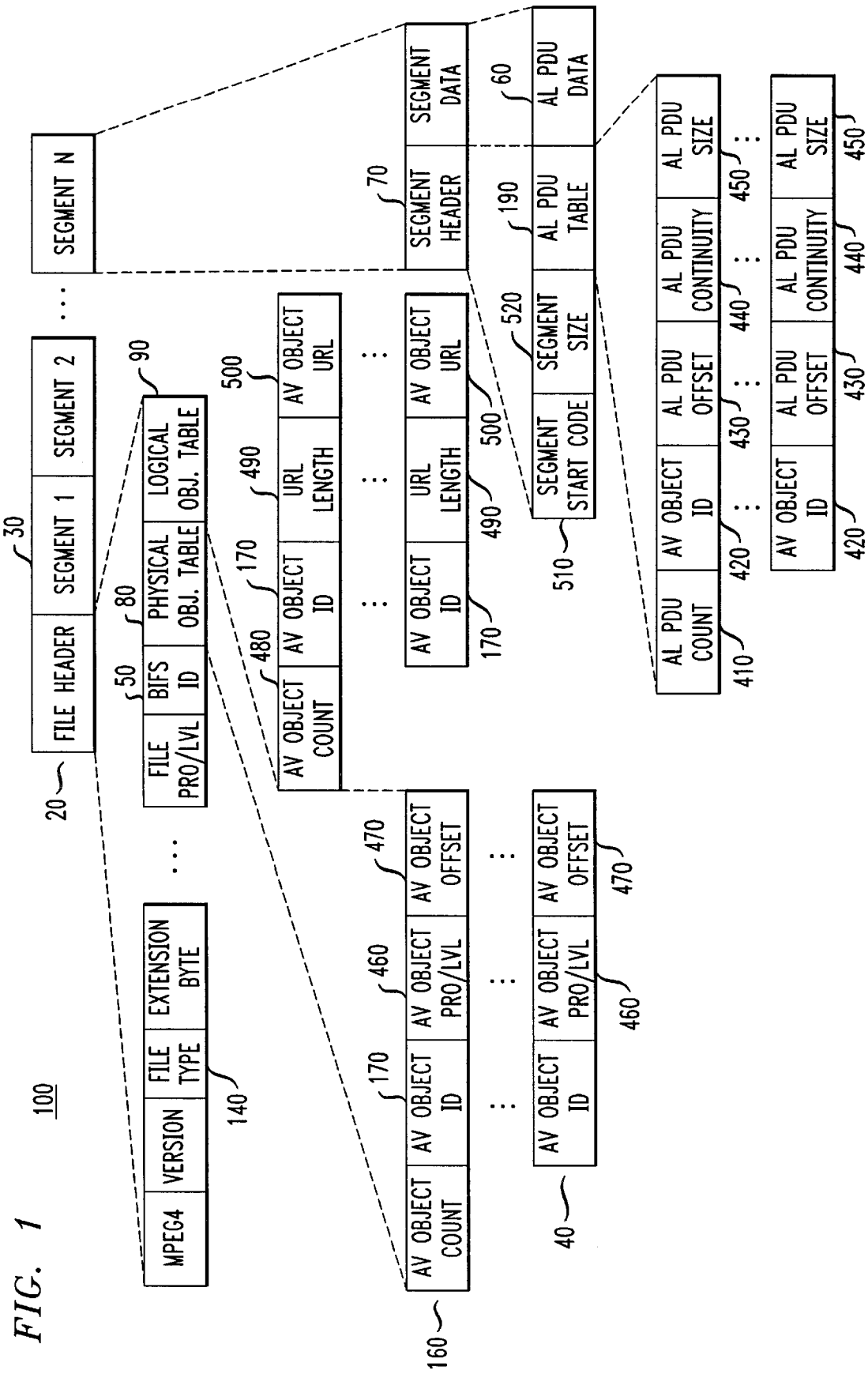
FIG. 1 illustrates a file format structure for stored files (with segments containing AL PDUs) according to a first illustrative embodiment of the invention.
Figure 2:
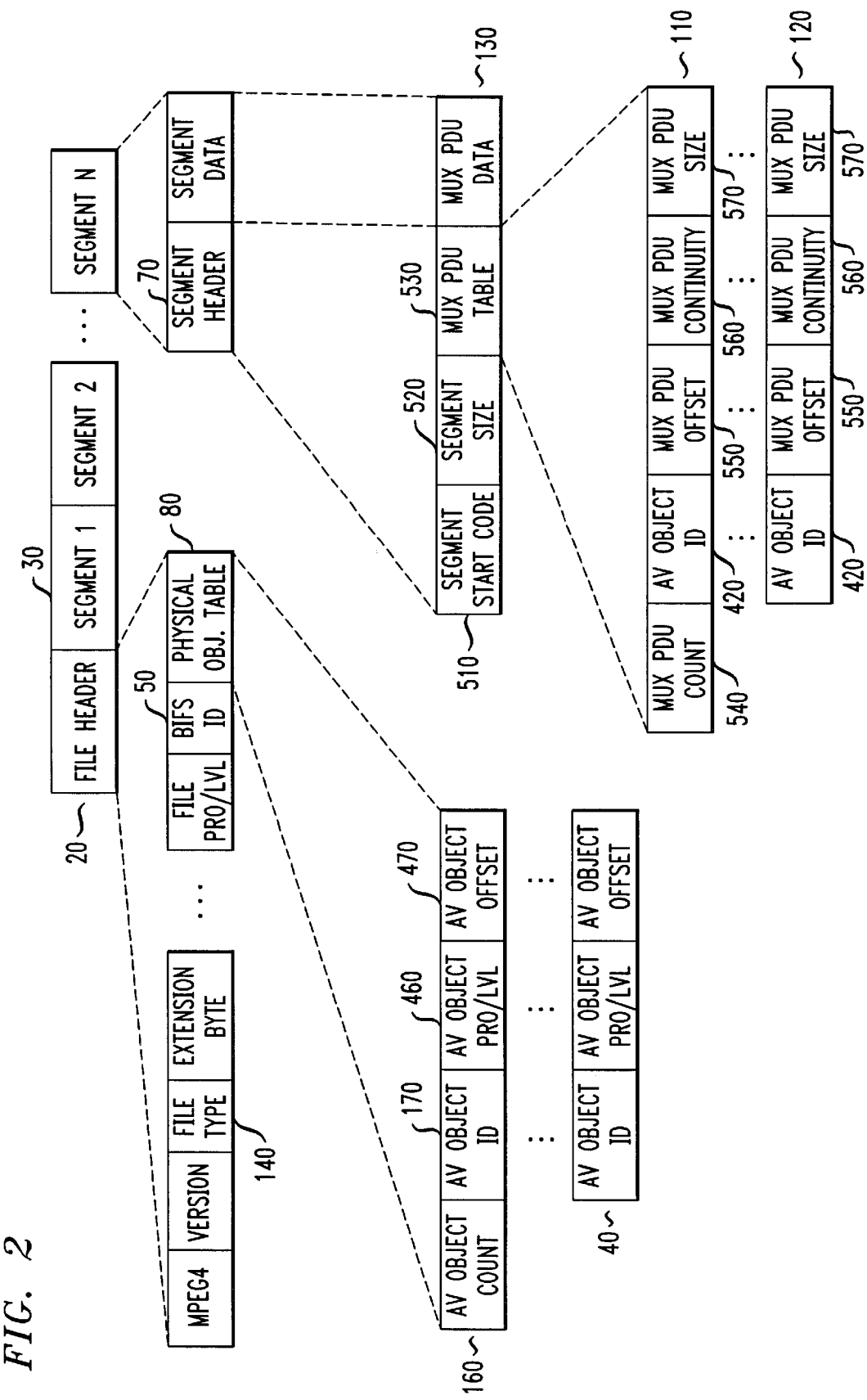
FIG. 2 illustrates a file format structure for streaming files (with segments containing FlexMux PDUs) according to a second illustrative embodiment of the invention.

FIG. 1 illustrates the stored format utilized in relation to a first illustrative embodiment of the invention for MPEG-4 files. Although the present invention is illustratively described in accordance with the stored format, the invention is not limited to utilization with stored files. The present invention may be for instance utilized directly with streamed files.

The stored format supports random accessing of AV objects. Accessing an AV object at random by object number involves looking up the AL PDU table 190 of a file segment 30 for the OBID. If the OBID is found, the corresponding AL PDU 60 is retrieved. Since an access unit can span more than one AL PDU 60, it is possible that the requested object is encapsulated in more than one AL PDU 60. In order to retrieve all the AL PDUs 60 that constitute the requested object, all the AL PDUs 60 with the requested OBID are examined and retrieved until an AL PDU 60 with the first bit set is found.

The first bit of an AL PDU 60 indicates the beginning of an access unit. If the ID is not found, the AL PDU table 190 in the next segment is examined. All AL PDU 60 segments are listed in the AL PDU table 190. This format allows more than one object (instance) with the same ID to be present in the same stream segment. It is assumed that AL PDUs 60 of the same OBID are placed in the file in their natural time (or playout) order.

The invention involves altering the POT structure to provide an expanded physical object table (EPOT). As illustrated in FIG. 5, the format of the EPOT 500 includes a counter (COUNT) 510 of the objects in the EPOT. For each object contained in the POT, the EPOT also contains a count of the different object instances inside the file (ICOUNT) 520, a list of the local OBID (LLOBID) 530, an object profile/level (OPL) 540 and a list of positions in the file of the first segment of logical object instance (FSLOI) 550. The LLOBID 530 is substituted for the OBID in the MPEG-4 standard and the FSLOI 550 is substituted for the first segment of object instance FSOI in the MPEG-4 standard.

The data access algorithm utilizing the operation of the EPOT 500 will now be described in relation to FIG. 6. The data access algorithm looks up the physical object table EPOT 500 corresponding to the first element of the list of local object identifiers (LLOBID) 530 in step 600. The list of positions in the file for the first segment of object instance (FSLOI) 550 associated with the first element of the list of local object identifiers (LLOBID) 530 is then accessed in step 605. The next segment offset (NSOFF) is set equal to the FSLOI 550 position for the first object in step 610. A pointer position is then incremented to the next segment offset position (NSOFF) in step 615.

The current list of object identifiers (CURRLOBID) is set equal to the list of local object identifiers (LLOBID) 530 in step 620. The algorithm then looks up the segment object table (SOT) corresponding to the current list of object identifiers (CURRLOBID) in step 625. The local segment offset (LSOFF) and the local AL PDU size (LUS) 195 are located in step 630 and the local segment offset (LSOFF) and the local AL PDU size (LUS) 195 data are accessed in step 635. Subsequently, the AL PDUs 60 in the segment 30 are loaded and processed in step 640.

In step 645, the continuity flags (CF) are parsed in order to determine if the object is fully contained in an AL PDU 60 or if the AL PDU 60 is the first, the last, or a middle section of an object in step 650. If the continuity flags denote that the end of the object has been reached, the current list of object identifiers (CURRLOBID) increments to the next element contained within the EPOT LOBID 530 in step 655 and the algorithm is terminated in step 660. Alternatively, the algorithm accesses the next segment offset (NSOFF) in step 665 and returns to step 615 to increment the pointer position to NSOFF.

With this operation utilizing the expanded physical object table (EPOT) 500, random access of the AV object data can be streamlined by removing the lookup mechanism of the segment object table (SOT). The EPOT 500 can be further extended to include the offsets directly to the data objects instead of the beginning of the segment containing the objects by means of a next object offset (NOFF) variable and a local AL PDU size (LUS) 195 variable. The AL PDU LUS 195 has not been used before as a controlling variable during data transmission; however, by using the AL PDU LUS as a variable during data transmission, a unit receiving data is capable of recognizing whether it has sufficient memory available to store the received data and whether the total data has been received during the receiving process.

Figure 3:
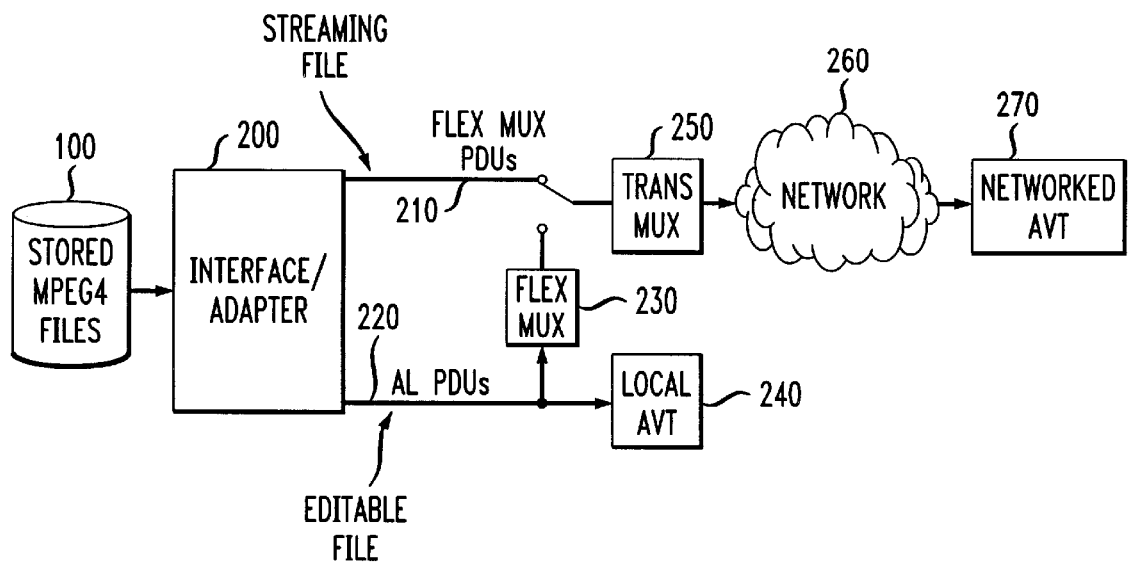
FIG. 3 illustrates an apparatus for storing audiovisual objects to audiovisual terminals according to the invention.
Figure 4:
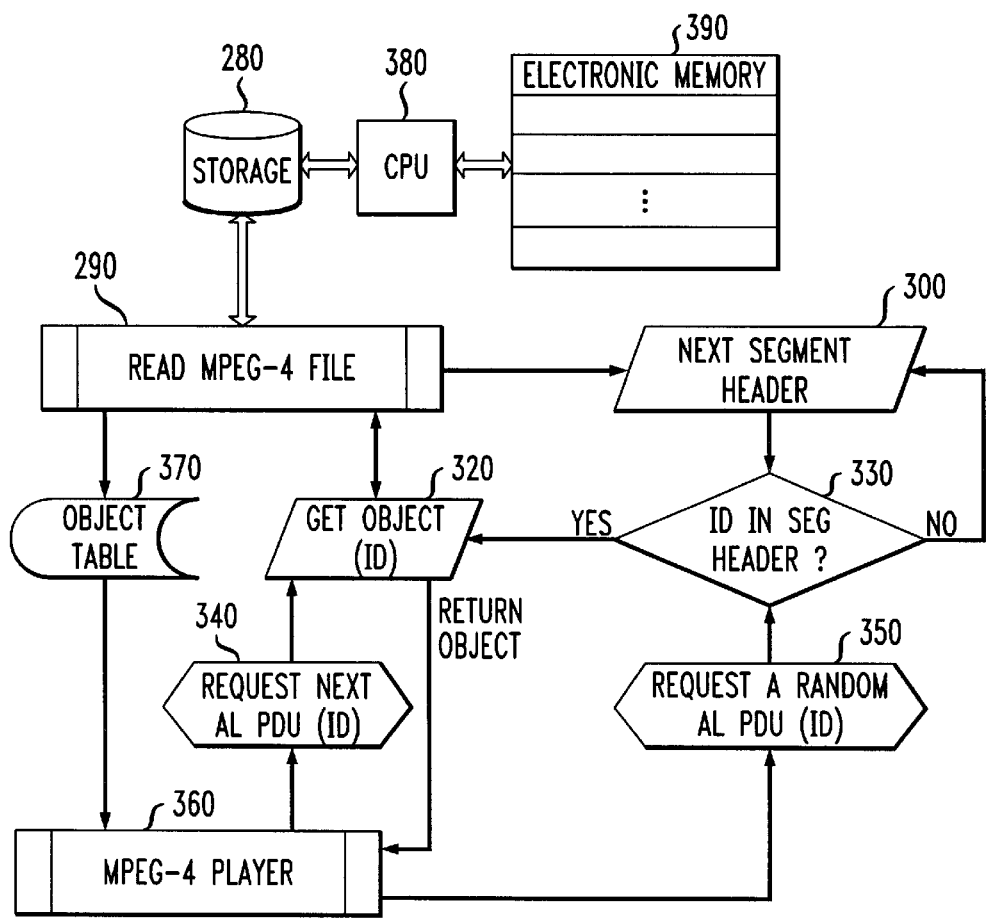
FIG. 4 illustrates an apparatus for extracting audiovisual data stored and accessed according to the invention.

The processing flow illustrated in FIG. 6 may be controlled by a file format interface 200 such as that illustrated in FIG. 3. FIG. 3 illustrates an apparatus for processing an MPEG-4 file 100 for playback according to the invention. In the apparatus illustrated in FIG. 3, MPEG-4 files 100 are stored on a storage media, such as a hard disk or CD ROM, which is connected to a file format interface 200 capable of programmed control of audiovisual information, including the processing flow illustrated in FIG. 6.

In a second illustrative embodiment of the invention, there is provided a further expanded EPOT, denoted FPOT 700 for "fat" POT. As shown in FIG. 7, the format of the FPOT 700 includes a counter (COUNT) 710 of the objects in the FPOT. The FPOT 700 also contains a count of the different object instances inside the file (ICOUNT) 720 and a list of local object identifiers (LLOBID) 730. The FPOT 700 also contains, for each object entry, an object profile/level (OPL) 740, a list of positions in the file of the first object instance (FLOI) 750, a table of next object offsets (NOFFs) 745 and local AL PDU sizes (LUSs) 760 relative to each segment.

The data access algorithm utilizing the operation of the FPOT 700 will now be described in relation to FIG. 8. The data access algorithm looks up the physical object table FPOT 700 corresponding to the first element of the local object ID (LLOBID) 730 in step 800. The list of positions in the file for the first object instance (FLOI) 750 associated with the first element of the LLOBID 730 and associated LUS 760 are accessed in step 805. A pointer position is incremented to the location of the first object instance (FLOI) 750 in step 810 and the LUS data 760 is accessed in step 815. Next, the AL PDUs 60 in the segment are loaded and processed in step 820.

In step 825, the continuity flags are parsed to determine if the object is fully contained in the AL PDU 60 or if the AL PDU 60 is the first, the last, or a middle section of an object during step 830. If the continuity flags denote that the end of the object has been reached, the algorithm is terminated in step 835. Alternatively, if the continuity flags have not reached the end of the object, the algorithm relocates to the next object offset (NOFF) 745 and the size of the adaptation layer process definition unit (AL PDU LUS) 760 is determined in step 840. Subsequently, the algorithm returns to step 810 to increment the pointer position to the next location of the first object instance (FLOI) 750 and subsequently access the LUS 760. The processing flow illustrated in FIG. 8 may be controlled by a file format interface 200 such as that illustrated in FIG. 3.

Throughput for MPEG-4 data access is thus faster according to the invention, because all the information necessary for accessing the objects is contained in the FPOT. Such an approach also simplifies a backward search (reverse traversal) because all the information necessary to access the objects is contained in the FPOT. Thus, implementation using the FPOT structure is the preferred mode for file editing. Further, the FPOT simplifies file conversion into a basic streaming file with or without data access via sequential data scanning based on segment start codes (SSC).

In terms of data structure, the data following the FPOT 700 is a concatenation of AL PDUs 60. The format illustrated in FIG. 9 is memory oriented and requires large memory for the FPOT. However, the format allows easy on-the-fly separation of the data access information (i.e., the FPOT entries) and object data (i.e., the AL PDUs). Therefore, the data access information and the object data can be sent over a network with different priorities. When indexing information is not required at the receiver (which is usually the case for most applications), the data access information does not need to be transmitted at all.

In a third illustrative embodiment of the present invention, a further structure is utilized to more efficiently manage the FPOT 700 of the second illustrative embodiment. In some cases a large FPOT requires extensive memory resources and creates problems with a CPU. For example, in mobile units containing scarce CPU/memory resources, utilization of the FPOT structure may be difficult. Thus, simplifying the FPOT structure by distributing the next object offset (NOFF) 745 and LUS 760 along with the AL PDU data 60 is beneficial.

Distributed next object chunk offset (DNOFF) information contains the offset value required for positioning to the first AL PDU 60 in the next segment. In the file structure according to the third illustrative embodiment, a further structure, denoted LPOT (local POT) 1000, is employed. In this structure, illustrated in FIG. 11, the DNOFF 1110 field is the first field before the first AL PDU 60 of the object to which the DNOFF 1110 refers. The distributed LUS (DLUS) 1160 field follows the DNOFF 1110.

More detail of the LPOT 1000 structure is shown in FIG. 10, with corresponding file structure shown in FIG. 11. Data access via the LPOT 1000, DNOFF 1110 and DLUS 1160 may be performed, for example, by a data access algorithm manipulating the loading and processing the AL PDUs 60 based on the distributed next object chunk offset (DNOFF) 1110.

Figure 12:
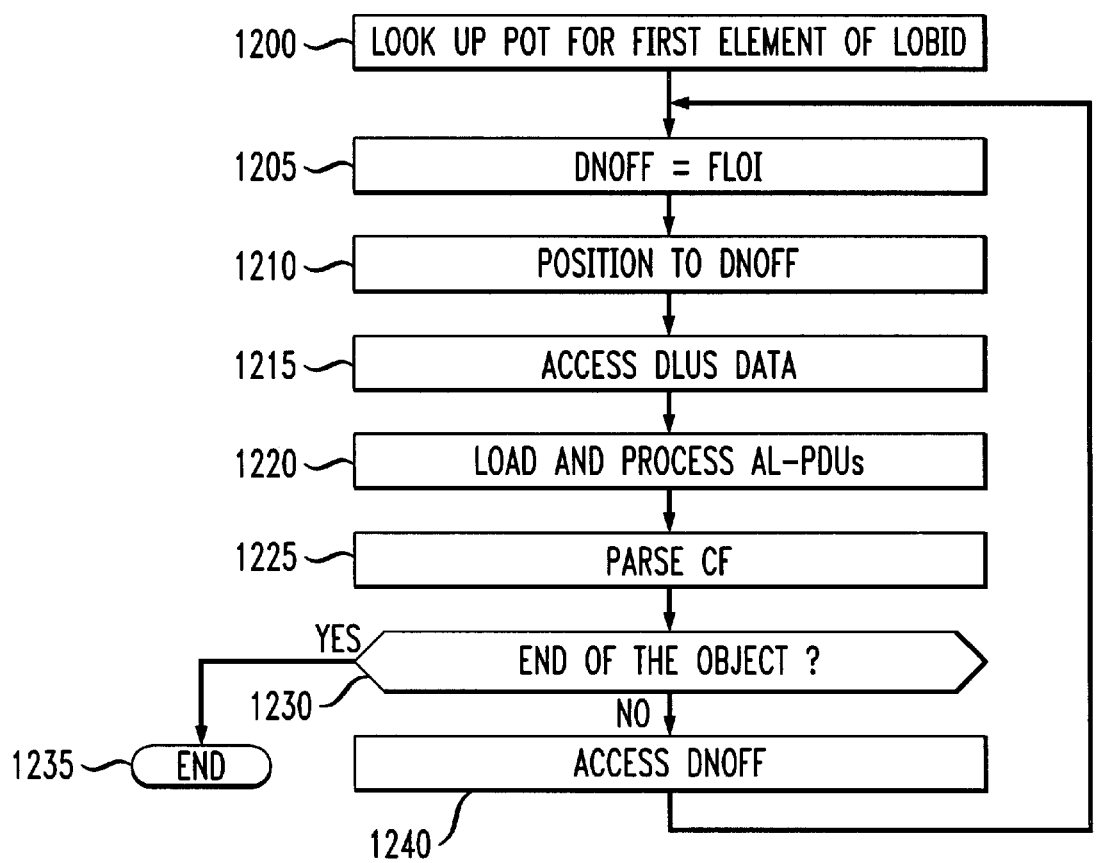
FIG. 12 illustrates data access algorithm performed in connection with the third illustrative embodiment of the invention.

The data access operation utilizing the LPOT 1000, DNOFF 1110 and DLUS 1160 structures of the third illustrative embodiment will now be described in relation to FIG. 12.

The physical object table LPOT 1000 corresponding to the first element of the LOBID is looked up in step 1200. Subsequently, the value for DNOFF 1110 is set equal to FLOI 1050 in step 1205. The pointer position is incremented to the location for DNOFF 1110 in step 1210 and the DLUS 1160 data is accessed in step 1215. The AL PDUs 60 in the segment are loaded and processed in step 1220.

The continuity flags (CF) are parsed in step 1225 in order to determine if the object is filly contained in the AL PDU or if the AL PDU is the first, last or a middle section of an object in step 1230. If the continuity flags denote that the end of the object has been reached, the algorithm is terminated in step 1235. Alternatively, the algorithm accesses DNOFF at step 1240, returns to step 1205 and sets the value of DNOFF to be equal to FLOI. The processing flow illustrated in FIG. 12 may be controlled by a file format interface 200 such as that illustrated in FIG. 3.

The foregoing description of the system, method and medium for processing audiovisual information of the invention is illustrative, and variations in construction and implementation will occur to persons skilled in the art. For instance, data access may be similarly performed via sequential data scanning (SSCA) based on segment start codes (SSC), segment size (SS) and the distributed next object chunk offset (DNOFF) and the distributed LUS (DLUS) of the third illustrative embodiment. Accessing the data using segments would be faster in locating the object chunks but slower in locating the LOBID which requires parsing of the AL PDU. The scope of the invention is therefore intended to be limited only by the following claims.

What is claimed is:

1. A method of composing data of coded audiovisual objects in a multimedia file, comprising the steps of:
    generating a file header, the file header containing physical object information and logical object information;
    generating a sequence of audiovisual segments, wherein each audiovisual segment includes a segment object table having entries containing pointers to access information, the access information being used to access the audiovisual objects in each audiovisual segment, each audiovisual segment comprising a plurality of audiovisual objects; and
    associating the audiovisual objects with the physical object information, wherein the physical object information comprises an expanded physical object table having entries including an ordered list of unique identifiers for every object instance which are pointers to access the audiovisual objects.

2. The method of claim 1, wherein the physical object information comprises a fat physical object table having entries containing pointers to access information, the access information being used to access the audiovisual objects in each audiovisual segment, the audiovisual objects being associated with the entries in the fat physical object table.

3. The method of claim 2, further comprising the step of using the fat physical object table to translate references to the audiovisual objects into local media addresses when the physical object information indicates that local media data are present.

4. The method of claim 2, further comprising the step of using the logical object information to translate references to the audiovisual objects into remote data calls, when the logical object information indicates that remote data are present.

5. The method of claim 2, wherein the fat physical object table comprises an audiovisual object ID field storing identifications of individual audiovisual objects and the access information for each audiovisual object.

6. The method of claim 2, wherein the audiovisual objects comprise protocol data units accessed through the fat physical object table.

7. The method of claim 1, further comprising the step of using the expanded physical object table and the segment object table to translate references to the audiovisual objects into local media addresses when the physical object information indicates that local media data are present.

8. The method of claim 1, further comprising the step of using the logical object information to translate references to the audiovisual objects into remote data calls, when the logical object information indicates that remote data are present.

9. The method of claim 1, wherein the audiovisual objects are accessible over a network on a streaming basis.

10. The method of claim 1, wherein the audiovisual objects are accessed from a mass storage medium.

11. The method of claim 1, wherein the file is an MPEG-4 file.

12. The method of claim 1, wherein the audiovisual objects are produced from different sources.

13. The method of claim 1, wherein the audiovisual objects are randomly accessible.

14. The method of claim 1, wherein each segment object table comprises an audiovisual object ID field storing identifications of individual audiovisual objects and the access information for each audiovisual object.

15. The method of claim 1, wherein the access information comprises offset information, continuity information, size information and count information for the audiovisual objects.

16. The method of claim 1, wherein the sequence of audiovisual segments comprises a termination segment indicating the end of the file.

17. The method of claim 1, wherein the audiovisual objects comprise protocol data units accessed through the segment object table.

18. The method of claim 1, wherein the file comprises binary format screen description information for assembling the audiovisual objects into a scene.

19. A method of extracting data of coded audiovisual objects from a file, comprising the steps of:
    accessing a file header comprising physical object information and logical object information;
    accessing an audiovisual segment, the physical object information comprises an expanded physical object table having entries including an ordered list of unique identifiers for every object instance which are pointers to access the entries in the object table, the audiovisual segment comprising a plurality of audiovisual objects; and
    accessing a sequence of audiovisual objects;
    wherein the physical object information contains pointers to access the audiovisual objects.

20. The method of claim 19, wherein the physical object information comprises a fat physical object table having entries containing pointers to access information, the access information being used to access the audiovisual objects; and
    the step of accessing the sequence of audiovisual segments is performed using the entries in the fat physical object table.

21. The method of claim 19, further comprising the step of using the fat physical object table to translate references to the audiovisual objects into local media addresses when the physical object information indicates that local media data are present.

22. The method of claim 20, further comprising the step of using the logical object information to translate references to the audiovisual objects to remote data calls, the logical object information indicates that remote data are present.

23. The method of claim 20, wherein the fat physical object table comprises an audiovisual object ID field storing identifications of individual audiovisual objects and the access information for each audiovisual object.

24. The method of claim 20, wherein the audiovisual objects comprise protocol data units accessed through the fat physical object table.

25. The method of claim 19, further comprising the step of using the expanded physical object table and the segment object table to translate references to the audiovisual objects into local media addresses when the physical object information indicates that local media are present.

26. The method of claim 19, further comprising the step of using the logical object information to translate references to the audiovisual objects to remote data calls, when the logical object information indicates that remote data are present.

27. The method of claim 19, further comprising the step of assembling the audiovisual objects into a scene.

28. The method of claim 19, wherein the audiovisual objects are accessible over a data network on a streaming basis.

29. The method of claim 19, wherein the audiovisual objects are accessed from a mass storage medium.

30. The method of claim 19, wherein the file is an MPEG-4 file.

31. The method of claim 19, further comprising the steps of:
    editing the audiovisual objects; and
    restoring the audiovisual objects in the file.

32. The method of claim 19, wherein the audiovisual objects are produced from different sources.

33. The method of claim 19, wherein the audiovisual objects are randomly accessible.

34. The method of claim 19, wherein the segment object table comprises an audiovisual object ID field storing identifications of individual audiovisual objects, and the access information for each audiovisual object.

35. The method of claim 19, wherein the access information comprises offset information, continuity information, size information and count information for the audiovisual objects.

36. The method of claim 19, further comprising the step of terminating the extraction of data upon reading a termination segment.

37. The method of claim 19, wherein the audiovisual objects comprise protocol data units accessed through the segment object table.

38. The method of claim 19, wherein the file comprises binary format screen description information for assembling the audiovisual objects into a scene.

39. A system for processing of coded audiovisual objects from a multimedia file, comprising the steps of:
    a processor unit;
    a storage unit, connected to the processor unit, the storage unit storing a file comprising:
    a file header comprising physical object information and logical object information, including the expanded physical object table, and
    a sequence of audiovisual objects, wherein the physical object tables translate references to the audiovisual objects into local media addresses when the physical object information indicates that local media data are present, including an ordered list of unique identifiers for every object instance, each audiovisual object comprising a plurality of audiovisual objects;
    wherein the physical object information contains pointers to access the audiovisual objects.

40. The system of claim 39, wherein the physical object information contains a fat physical object table used by the system to translate references to the audiovisual objects into local media addresses when the physical object information indicates that local media data are present.

41. The system of claim 40, wherein the fat physical object table comprises an audiovisual object ID field storing identifications of individual audiovisual objects and access information for each audiovisual object.

42. The system of claim 40, wherein the audiovisual objects comprise protocol data units accessed using the fat physical object table.

43. The system of claim 39, wherein the system translates references to the audiovisual objects into remote data calls using a logical object table when the logical object information indicates that remote data are present.

44. The system of claim 39, wherein the audiovisual objects are accessible over a network on a streaming basis.

45. The system of claim 39, wherein the storage unit comprises a mass storage medium.

46. The system of claim 39, wherein the file is an MPEG-4 file.

47. The system of claim 39, wherein the audiovisual objects are produced from different sources.

48. The system of claim 39, wherein the audiovisual objects are randomly accessible from the storage unit.

49. The system of claim 39, wherein the segment object table comprises an audiovisual object ID field storing identifications of individual audiovisual objects and access information for each audiovisual object.

50. The system of claim 39, wherein the access information comprises offset information, continuity information, size information and count information for the audiovisual objects.

51. The system of claim 39, wherein the sequence of audiovisual segments comprises a termination segment indicating the end of the file.

52. The system of claim 39, wherein the audiovisual objects comprise protocol data units accessed using the expanded physical object table and the segment object table.

53. The system of claim 39, wherein the file comprises binary format screen description information for assembling the audiovisual objects into a scene.

54. A medium for storing data of coded audiovisual objects in a multimedia file, the data file including information for processing by an information processing apparatus to perform the steps of:
    generating or accessing a file, the file comprising a file header and an audiovisual segment comprising a plurality of audiovisual objects, the file header including physical object information and logical object information, wherein the physical object information comprises an expanded physical object table which translates references to the audiovisual objects into local media addresses when the physical object information indicates that local media data are present which contains an ordered list of unique identifiers for every object instance which are pointers to access the audiovisual object; and
    generating or accessing the audiovisual objects using the physical object information.

55. The medium of claim 54, wherein the physical object information comprises a fat physical object table which translates references to the audiovisual objects into local media addresses when the physical object information indicates that local media data are present.

56. The medium of claim 54, wherein the file header comprises a logical object table which translates references to the audiovisual objects into remote data calls, when the logical object information indicates that remote data are present.

57. The medium of claim 54, wherein the audiovisual objects are accessible over a network on a streaming basis.

58. The medium of claim 54, wherein the medium comprises a mass storage medium.

59. The medium of claim 54, wherein the file comprises binary format screen description information for assembling the audiovisual objects into a scene.

60. A method of composing data of coded audiovisual objects in a multimedia file, the data including a file header, the file header containing physical object information and logical object information, comprising the steps of:

generating a sequence of audiovisual segments, wherein each audiovisual segment includes a segment object table having entries containing pointers to access information, the access information being used to access the audiovisual objects in each audiovisual segment, each audiovisual segment comprising a plurality of audiovisual objects; and associating the audiovisual objects with the physical object information, wherein the physical object information comprises an expanded physical object table having entries including an ordered list of unique identifiers for every object instance which are pointers to access the audiovisual objects.

61. A method of composing data of coded audiovisual objects in a multimedia file, the data including a file header, the file header containing physical object information and logical object information, comprising the steps of:

generating a sequence of audiovisual segments, wherein each audiovisual segment includes a plurality of audiovisual objects; and associating the audiovisual objects with the physical object information, wherein the physical object information comprises an expanded physical object table having entries including an ordered list of unique indentifiers for every object instance which are pointers to access the audiovisual objects.

62. A system for processing of coded audiovisual objects from a multimedia file including a processor unit, a storage unit, connected to the processor unit, the storage unit storing a file including a file header comprising physical object information and logical object information, including the expanded physical object table, comprising:

a sequence of audiovisual objects, wherein the physical object tables translate references to the audiovisual objects into local media addresses when the physical object information indicates that local media data are present, including an ordered list of unique identifiers for every object instance, each audiovisual object comprising a plurality of audiovisual objects;

wherein the physical object information contains pointers to access the audiovisual objects.

63. A medium for storing data of coded audiovisual objects in a file, the file comprising a file header and an audiovisual segment comprising a plurality of audiovisual objects, the file header including physical object information and logical object information, wherein the physical object information comprises an expanded physical object table which translates references to the audiovisual objects into local media addresses when the physical object information indicates that local media data are present which contains an ordered list of unique identifiers for every object instance which are pointers to access the audiovisual object, the file including information for processing by an information processing apparatus to perform the step of:

generating or accessing the audiovisual objects using the physical object information.

* * * * *